US005984175A

United States Patent [19]

Popp

[11] Patent Number: 5,984,175

[45] Date of Patent: Nov. 16, 1999

[54] DEVICE AND PROCESS FOR DETECTING AND IDENTIFYING WEARABLE USER IDENTIFICATION UNITS

[75] Inventor: Hans-Joachim Popp, Lübeck, Germany

[73] Assignee: Drägerwerk AG, Lubeck, Germany

[21] Appl. No.: 08/919,981

[22] Filed: Aug. 28, 1997

[30] Foreign Application Priority Data

Apr. 3, 1997 [DE] Germany .......................... 197 13 736

[51] Int. Cl.[6] ............................ G06F 17/00; G06K 5/00; G06K 19/06; G08C 19/00

[52] U.S. Cl. .......................... 235/375; 235/382; 235/492; 340/825.69

[58] Field of Search .................................. 235/375, 382, 235/492; 340/825.69

[56] References Cited

U.S. PATENT DOCUMENTS

| | | | |
|---|---|---|---|
| 3,752,960 | 8/1973 | Walton | 235/61.11 H |
| 3,816,708 | 6/1974 | Walton | 235/61.11 H |
| 3,816,709 | 6/1974 | Walton | 235/61.11 H |
| 4,236,068 | 11/1980 | Walton | 235/380 |
| 4,384,288 | 5/1983 | Walton | 340/825.34 |
| 4,689,619 | 8/1987 | O'Brien, Jr. | 340/825.08 |
| 5,103,222 | 4/1992 | Hogen Esch et al. | 340/825.54 |
| 5,105,190 | 4/1992 | Kip et al. | 340/825.54 |
| 5,184,001 | 2/1993 | Levionnais | 235/449 |
| 5,287,266 | 2/1994 | Malec et al. | 364/401 |
| 5,302,954 | 4/1994 | Brooks et al. | 342/44 |
| 5,423,334 | 6/1995 | Jordan | 128/899 |
| 5,581,707 | 12/1996 | Kuecken | 395/200.13 |
| 5,661,286 | 8/1997 | Fujioka | 235/382 |
| 5,705,991 | 1/1998 | Kniffin et al. | 340/825.34 |

FOREIGN PATENT DOCUMENTS

WO 93/18476 9/1993 WIPO .

*Primary Examiner*—Donald Hajec
*Assistant Examiner*—Daniel Sherr
*Attorney, Agent, or Firm*—McGlew and Tuttle, P.C.

[57] ABSTRACT

A device for detecting and identifying wearable identification units (20) for users at a predetermined distance around a central station (2). The central station (2) has a transmitter (4) and a receiver (6) for electromagnetic signals and a control unit (8), which initiates the sending of a polling signal at predetermined time. The time may be based on multiples of intervals. Furthermore, there are a plurality of wearable identification units (20), which have a transmitter (22) and a receiver (24) for electromagnetic signals and a control unit (26), which is designed to initiate the sending of an identification unit-specific response signal by the transmitter (22) upon the reception of the polling signal after a time delay which is specific of the particular identification unit (20), wherein the identification unit-specific time delays of the plurality of identification units (20) are selected to be such that the response signals of no pair of identification units (20) will overlap when the pair of identification units (20) receives the polling signals of the central station (2). The control unit (8) of the central station (2) is designed to analyze the signal received after the sending of the polling signal and to determine the time between the sending of the polling signal and the reception of a signal in order to detect the presence of an identification unit (20) and to identify it based on the identification unit-specific response signal and based on the identification unit-specific time delay.

20 Claims, 2 Drawing Sheets

DEVICE AND PROCESS FOR DETECTING AND IDENTIFYING WEARABLE USER IDENTIFICATION UNITS

FIELD OF THE INVENTION

The present invention pertains to a device for detecting and identifying wearable identification units for users, especially for detecting and identifying care personnel at medical workplaces.

BACKGROUND OF THE INVENTION

Such devices and processes are needed, e.g., to detect the presence of certain care personnel at medical workplaces, such as intensive care units or operating rooms in order to control the medical devices depending on the presence of certain persons, e.g., to permit a change in certain settings of devices only in the presence of certain authorized persons. Other examples of application are found in the area of user identification in computer systems, e.g., to authorize data entry, which shall be performed by certain, identified persons only. Other examples of application are in the determination of the time during which personnel is present at certain workplaces, e.g., at intensive care units or hospital beds.

The authorization to operate a device or to control the behavior of a device proper as a function of the presence of a person usually requires an action by that person directed to this authorization. This authorization has been associated in the past with the entry of passwords or the insertion of machine-readable identification cards. The use of transponders in electromagnetic fields is an approach to the contactless transmission of information. The problems with these techniques are the relatively high cost of a detector, the usually large size of the antennas, the fault liability depending on the environment of the installation, and the like.

A second approach, which has found wide acceptance among consumers, is the use of infrared transmitters, which send a coded signal as a "key" to a device in order to activate or otherwise set this device. Such infrared transmitters are widespread in automobiles to trigger locking. The problem with this technique is that the user must hold the transmitter in his hand and must trigger it while directing it toward the receiver, which would be undesirable in many fields of application. Furthermore, the safety of such infrared keys against misuse is not sufficient.

An identification system, in which persons who wear a badge are tracked and identified, has been known from WO 93/18476. Each badge is provided with an infrared transmitter and a microprocessor, which ensures that an infrared signal unambiguously identifying the badge is sent periodically, e.g., every 10 sec. A plurality of receiver stations are distributed over the area to be observed, and the receiver station which has received the identifying infrared signal sends it to a central station. The location of the person in question can thus be tracked (based on the location of the receiver station) over time. The drawback of this process is that each identification unit or badge must continually send identification signals, which makes the identification unit to be worn by the user unwieldy because of the energy storage means it needs. Furthermore, sufficient safety against misidentification is not guaranteed, especially if a plurality of users are located in the vicinity of a receiver station.

SUMMARY AND OBJECTS OF THE INVENTION

The primary object of the present invention is to provide a device and a process for detecting and identifying wearable user identification units within a predetermined distance around a central station, with which device and process it is also possible to reliably detect and identify a plurality of users.

According to the invention, a device for detecting and identifying wearable identification units for users at a predetermined distance around a central station is provided. The device includes a transmitter and a receiver for electromagnetic signals and a control unit in a central station. The control unit initiates the sending of a polling signal by the transmitter at predetermined time intervals.

A plurality of wearable identification units are provided, which each have a transmitter and a receiver for electromagnetic signals and an identification unit control unit. The control unit of the id unit is designed to initiate the sending of an identification unit-specific response signal by the transmitter. The sending of the signal is initiated upon the reception of the polling signal by the receiver after a time delay which is specific to the particular identification unit. The identification unit-specific time delays of the plurality of identification units are selected to be such that the response signals of no pair of identification units will overlap in time when the pair of identification units receives the polling signal of the central station. The control unit of the central station is designed to analyze the signals received by the receiver after the sending of the polling signal and to determine the time interval between the sending of the polling signal and the reception of a signal. This allows detection of the presence of a particular identification unit at a predetermined distance around the central station. This allows identification based on the identification unit-specific response signal and based on the identification unit-specific time delay.

According to the invention a process is provided for the wireless detection of the presence and the identification of wearable identification units for users of these units at a predetermined distance around a central station. The invention also comprises a system for carrying out this process. The system and process are based on the central station provided with a transmitter and a receiver for electromagnetic signals and with a control unit, which initiates the sending of a polling signal by the transmitter at predetermined intervals. Each of the wearable identification units also has a transmitter and a receiver for electromagnetic signals and a control unit, which is designed to initiate the sending of an identification unit-specific response signal by the transmitter upon the reception of the polling signal with a time delay which is specific of the particular identification unit. The identification unit-specific time delays are staggered in the plurality of identification units such that the response signals from any pair of identification units will not overlap in time when the pair is triggered simultaneously by the polling signal of the central station. The control device of the central station analyzes the signals received after the sending of the polling signal and determines the time between the sending of the polling signal and the reception of a signal in order to detect the presence of an identification unit and to identify it based on the identification unit-specific response signal and based on the identification unit-specific time delay.

A considerable improvement in the reliability of identification and in safety against misuse is achieved due to the evaluation of both the identification unit-specific response signal itself and the identification unit-specific time delay. Furthermore, the staggering of the time delays of the different identification units makes it possible to reliably identify a plurality of identification units present in the area around the central station independently from one another. The area or the distance at which identification units are detected around the central station is predetermined by the transmission and reception power of the identification units and of the central station.

The energy consumption in the identification units is low due to the bidirectional connection between identification units and the central station, because a response signal is sent only if a polling signal had been received from the central station before. The polling signal of the central station may consist of a single pulse, which is used only to trigger the identification units.

In an advantageous embodiment, each identification unit is locked, after it has sent its response signal, for a period of time which is longer than the maximum time delay in the plurality of identification units. Mutual interferences caused by adjacent identification units, which could trigger a new response signal by their response signal if the latter were misinterpreted as a polling signal, shall be avoided as a result.

In an advantageous embodiment, the transmitters and receivers are designed as infrared transmitters and infrared receivers, which make it possible to design the identification units and the central station as compact and inexpensive units.

Furthermore, a process for controlling devices, especially monitoring devices and medical devices supporting vital functions, is proposed, wherein the claimed process is used to authorize a change in the setting of devices depending on the detected presence of predetermined identification units.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
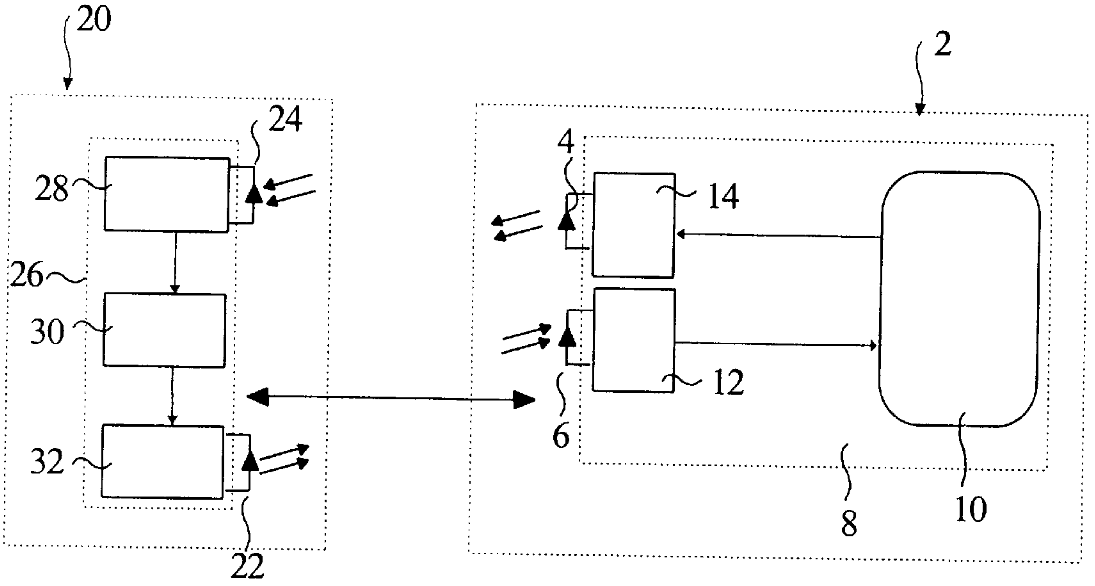
FIG. 1 is a schematic block diagram of an identification unit and of the central station.

The device shown in FIG. 1 comprises an identification unit 20 to be worn by a user and a central station 2, which is composed here of a workplace computer 10 and a box connected to it, in which an infrared transmitter 4 and an infrared receiver 6 with the electronic circuits 14 and 12 belonging to them are arranged.

Each identification unit 20 comprises an infrared receiver 24 and an infrared transmitter 22, as well as a control unit 26. A trigger circuit 28, which is connected to the infrared receiver 24 and is triggered upon the reception of the polling signal from the central station 2, is located in the control unit 26. The trigger circuit 28 is connected to a time element 30, which presets a time delay specific of the particular identification unit 20 (i.e., a time delay coding the particular identification unit). The time element 30 is connected to a transmitter coding circuit 32, which is activated by the time element after the expiration of the preset time delay. By means of the infrared transmitter 22, the transmitter coding circuit 32 then generates a set of pulses, in which a permanently set code number is contained in the binary coded form for the identification unit 20. At the time of the manufacture of the identification unit 20, the time element 30 is wired or programmed such that it will generate a predetermined time delay for the particular identification unit 20.

The cycle of recognition and identification takes place as follows. In the central station 2, the workplace computer 10 triggers the sending of an infrared signal by the infrared transmitter 4 via the transmitter circuit 14 at predetermined intervals of time (e.g., a burst with a length of 100 msec and a basic frequency of 100 kHz). This polling signal is received by the infrared receiver 24 of an identification unit 20 located within the range of the signal which may define the functional area. This results in the trigger circuit 28 being triggered. The trigger circuit 28 then starts the time element 30 of control unit 26. The time element will then actuate the transmitter coding circuit 32 after the expiration of the predetermined time delay. The time delay may be set in advance and may be changeable or fixed after being initially set. The time delay and the associated unit are provided as data accessible by the central unit control unit 8. The transmitter coding circuit 32 will then generate a response signal specific to the particular identification unit 20 and sends it via the infrared transmitter 22. This response signal is again received by the infrared receiver 6 in the central station 2 and is analyzed in the detector circuit 12. Furthermore, the period of time between the sending of the polling signal and the reception of a response signal is determined by means of the workplace computer 10.

Figure 2:
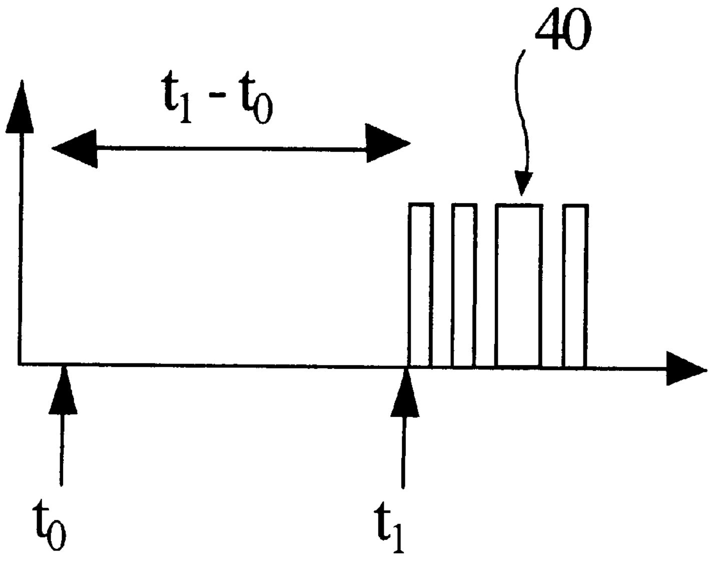
FIG. 2 is the graph of a response signal received by the central station as a function of time.

The period of time from the sending of the polling signal to the arrival of the response signal is shown schematically in FIG. 2. The polling signal is sent by the central station 2 at the time $t_0$. The reception of the response signal 40 of a defined identification unit 20 begins at the time $t_1$. The time delay $t_1-t_0$ determined is evaluated in order to obtain an additional identification of the response signal received. The reliability of correct identifications is markedly improved by the combination of the analysis of the identification unit specific response signal itself and of the time delay set at the particular unit 20 and known by the control unit 8, which represents an additional, coded identification of the particular identification unit 20.

The device is secured against misuse or misidentification by the fact that there would be only a remote chance of sending a (possibly even correct) binary code by means of, e.g., a commercially available IR remote control exactly with the correct time delay.

Due to the staggering of the time delays in such a way that the response signals of any two identification units 20 from the plurality of identification units 20 can never overlap, it is possible to simultaneously reliably detect all identification units 20 independently from one another. The staggering of the time delays can be arranged, e.g., by putting the plurality of identification units 20 in an order and assigning to each following identification unit 20 a time delay which is longer than that of the preceding identification unit 20 plus the maximum duration of the response signal. The time interval at which the central station 2 sends polling signals must, of course, be longer than the maximum time delay of an identification unit 20.

The use of infrared transmitters and receivers has the advantage that the identification units 20 may be designed such that they will send a directed signal. If the identification unit 20 is designed as, e.g., a card to be worn on the chest, which sends the signal in a directed manner in the forward direction, detection and identification will take place only if the user faces the central station 2. This defines a smaller functional area. As a result, it is ensured in the case of use in medical working environments that the person identified faces the central station 2 and the instruments connected to same are in his field of vision.

While a specific embodiment of the invention has been shown and described in detail to illustrate the application of the principles of the invention, it will be understood that the invention may be embodied otherwise without departing from such principles.

What is claimed is:

1. A device for detecting system users, comprising:

a central station disposed within a predetermined distance around an area for the system users, said central station having a transmitter and a receiver for electromagnetic signals and with a control unit, said central station control unit initiating the sending of a polling signal by said transmitter at predetermined times; and a plurality of wearable identification units for the system users, said identification units each having a transmitter and a receiver for electromagnetic signals and an identification unit control unit, said identification unit control unit initiating a sending of an identification unit-specific response signal by said identification unit transmitter upon a reception of the polling signal by said identification unit receiver after a time delay, said time delay being unique to a particular identification unit of said identification units, said identification unit-specific time delays of said plurality of identification units being selected such that response signals of said identification units will not overlap in time when any of said identification units receives a polling signal of said central station, said central station control unit analyzing signals received by said central unit receiver after sending the polling signal and determining a time duration between the sending of the polling signal and the reception of a signal, for detecting the presence of said particular identification unit at a predetermined distance around said central station based on the identification unit-specific response signal and based on the identification unit-specific time delay.

2. The device in accordance with claim 1, wherein said control unit of each said identification units locks said identification unit for the sending of additional response signals for a time period which is longer than the maximum, identification unit-specific time delay in the plurality of said identification units after the sending of the response signal.

3. The device in accordance with claim 1, wherein said central station transmitter and said wearable identification unit transmitter are infrared transmitters and said central station receiver and said wearable identification unit receiver are infrared receivers.

4. The device in accordance with claim 1, wherein each said identification unit control unit generates as the identification unit-specific response signal a set of pulses.

5. The device in accordance with claim 1, further comprising:

control means for activating and deactivating said at least one of a monitoring device and medical device in response to signals from said central station control unit.

6. The device according to claim 1, wherein:

said polling signal is a single signal and all said identification units respond to said single polling signal with respective said response signals after respective said time delays.

7. The device according to claim 1, wherein:

a round trip time of said polling signal to each of said identification units and said response signal to said central station is different for each of said identification units.

8. A system for detecting authorized users, comprising:

a central station disposed within a predetermined distance around an area for the system users, said central station having a transmitter and a receiver for electromagnetic signals and with a control unit, said central station control unit initiating the sending of a polling signal by said transmitter at predetermined times; and a plurality of wearable identification units for the system users, said identification units each having a transmitter and a receiver for electromagnetic signals and an identification unit control unit, said identification unit control unit initiating a sending of an identification unit-specific response signal by said identification unit transmitter upon a reception of the polling signal by said identification unit receiver after a time delay, said time delay being unique to a particular identification unit of said identification units, said identification unit-specific time delays of said plurality of identification units being selected such that response signals of said identification units will not overlap in time when any of said identification units receives a polling signal of said central station, said central station control unit analyzing signals received by said central unit receiver after sending the polling signal and determining a time duration between the sending of the polling signal and the reception of a signal, for detecting the presence of said particular identification unit at a predetermined distance around said central station based on the identification unit-specific response signal and based on the identification unit-specific time delay.

9. The system in accordance with claim 8, wherein said control unit of each said identification unit locks said identification unit for the sending of additional response signals for a time period which is longer than the maximum, identification unit-specific time delay in the plurality of said identification units after the sending of the response signal.

10. The system in accordance with claim 8, wherein said central station transmitter and said wearable identification unit transmitter are infrared transmitters and said central station receiver and said wearable identification unit receiver are infrared receivers.

11. The system in accordance with claim 8, wherein each said identification unit control unit generates as the identification unit-specific response signal a set of pulses.

12. The system in accordance with claim 8, wherein said central station is associated with at least one of a monitoring device and medical device, supporting vital functions of a patient.

13. The system in accordance with claim 9, further comprising:

control means for activating and deactivating said at least one of a monitoring device and medical device in response to signals from said central station control unit.

14. The system according to claim 8, wherein:

said polling signal is a single signal and all said identification units respond to said single polling signal with respective said response signals after respective said time delays.

15. The system according to claim 8, wherein:

a round trip time of said polling signal to each of said identification units and said response signal to said central station is different for each of said identification units.

16. Process for the wireless detection of the presence of an authorized user of a system, the process comprising the steps of:

providing a central station;

providing authorized system users with a particular identification unit for users at a predetermined area around said central station;

operating an electromagnetic signal transmitter and a receiver with a control unit at the central station such that the transmitter sends a polling signal at predetermined time intervals;

operating an electromagnetic signal transmitter and a receiver at the identification units with a control unit which initiates the sending of an identification unit-specific response signal by the transmitter upon the reception of the polling signal by the said receiver and after a time delay which is unique to each said particular identification unit;

selecting identification unit-specific time delays of the plurality of said identification units to be such that the response signals of no pair of said identification units will overlap in time when such pair of identification units receives the polling signal of the central station; and analyzing the signals received by the central station receiver with the control unit of the central station after the sending of the polling signal and determining the time between the sending of the polling signal and the reception of a signal in order to detect the presence of said particular identification unit at the predetermined distance around the central station and to identify said particular identification unit based on the identification unit-specific response signal and based on the identification unit-specific time delay.

17. The process in accordance with claim 16, wherein after the sending of the response signal, each said identification unit is prevented from sending additional response signals for a period of time which is longer than the maximum, identification unit-specific time delay of the plurality of said identification units.

18. The process according to claim 16, further comprising:

providing at least one of a monitoring device and medical device, supporting vital functions of a patient, associated with said central station and controlling authorization for changing a setting of the device as a function of the detected presence of said predetermined identification units.

19. The process according to claim 16, wherein:

said polling signal is a single signal and all said identification units respond to said single polling signal with respective said response signals after respective said time delays.

20. The process according to claim 16, wherein:

a round trip time of said polling signal to each of said identification units and said response signal to said central station is different for each of said identification units.

* * * * *